US009804709B2

(12) United States Patent
Seto et al.

(10) Patent No.: US 9,804,709 B2
(45) Date of Patent: Oct. 31, 2017

(54) VECTOR FILL SEGMENT METHOD AND APPARATUS TO REDUCE DISPLAY LATENCY OF TOUCH EVENTS

(71) Applicant: Samsung Display Co., Ltd., Yongin-si, Gyeonggi-do (KR)

(72) Inventors: Frank C. Seto, San Jose, CA (US); Seokjin Han, Cupertino, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 110 days.

(21) Appl. No.: 14/994,104

(22) Filed: Jan. 12, 2016

(65) Prior Publication Data

US 2016/0320912 A1 Nov. 3, 2016

Related U.S. Application Data (60) Provisional application No. 62/154,015, filed on Apr. 28, 2015.

(51) Int. Cl.
  *G06F 3/041* (2006.01)
  *G06T 11/20* (2006.01)
  (Continued)

(52) U.S. Cl.
  CPC .......... *G06F 3/0418* (2013.01); *G06F 3/0414* (2013.01); *G06F 3/0416* (2013.01);
  (Continued)

(58) Field of Classification Search
  CPC .... G06F 3/0414; G06F 3/0416; G06F 3/0418; G06F 3/04883; G06T 11/203; G06T 11/40
  See application file for complete search history.

(56) References Cited

U.S. PATENT DOCUMENTS 5,731,820 A 3/1998 Broekhuijsen
6,313,838 B1 11/2001 Deering
(Continued)

FOREIGN PATENT DOCUMENTS

EP 2045777 A2 4/2009
EP 2799961 A1 11/2014
EP 2927794 A1 10/2015

OTHER PUBLICATIONS

EPO Extended Search Report dated Sep. 8, 2016, for corresponding European Patent Application No. 16167584.8 (6 pages).

*Primary Examiner* — Dmitriy Bolotin
(74) *Attorney, Agent, or Firm* — Lewis Roca Rothgerber Christie LLP (57) ABSTRACT

A method of generating a mask overlay for a display corresponding to a touch path, the method including receiving touch path data including touch points corresponding to the touch path, generating vertex points of a vertex array corresponding to the touch points, generating a polygon for a set of the vertex points to define edges of the touch path, determining start and stop edges of the polygon for a row of pixels, generating a list of bin offset values corresponding to the row and including bin offsets for indicating the edges by incrementing a bin offset for each of the start edges, and by decrementing a subsequent bin offset for each of the stop edges, generating an accumulator value corresponding to each of the pixels, determining whether the accumulator values are greater than or equal to zero, and generating the mask overlay by determining whether respective accumulator values is greater than zero.

20 Claims, 7 Drawing Sheets

(51) Int. Cl.
    *G06T 11/40*       (2006.01)
    *G06F 3/0488*     (2013.01)

(52) U.S. Cl.
    CPC ........ *G06F 3/04883* (2013.01); *G06T 11/203* (2013.01); *G06T 11/40* (2013.01)

(56) References Cited

U.S. PATENT DOCUMENTS

| | | |
|---|---|---|
| 8,520,007 B2 | 8/2013 | Kato et al. |
| 8,725,443 B2 | 5/2014 | Uzelac et al. |
| 2010/0277429 A1* | 11/2010 | Day ................ G06F 3/0416 345/173 |
| 2011/0298807 A1* | 12/2011 | Kim ................ G06T 11/203 345/442 |
| 2011/0304643 A1* | 12/2011 | Marison ........... G06F 3/04883 345/611 |
| 2013/0265239 A1* | 10/2013 | Parekh ............. G06F 3/04883 345/173 |
| 2013/0293554 A1* | 11/2013 | Vostrikov ......... G06T 11/203 345/442 |
| 2013/0307795 A1 | 11/2013 | Suarez Rovere |
| 2013/0308863 A1* | 11/2013 | Zou ................. G06F 3/04883 382/186 |
| 2014/0002400 A1 | 1/2014 | Christiansson et al. |
| 2014/0300606 A1* | 10/2014 | Nakada ............ G06T 11/203 345/441 |
| 2015/0062021 A1 | 3/2015 | Skaljak et al. |
| 2015/0277653 A1* | 10/2015 | Xiong .............. G06F 3/0414 345/173 |

* cited by examiner

VECTOR FILL SEGMENT METHOD AND APPARATUS TO REDUCE DISPLAY LATENCY OF TOUCH EVENTS

CROSS-REFERENCE TO RELATED APPLICATIONS

This application claims priority to, and the benefit of, U.S. Provisional Patent Application No. 62/154,015, titled "A VECTOR FILL SEGMENT METHOD AND APPARATUS TO REDUCE DISPLAY LATENCY OF TOUCH EVENTS," filed in the United States Patent and Trademark Office on Apr. 28, 2015, the entire disclosure of which is incorporated herein by reference.

BACKGROUND

1. Field

Embodiments of the present invention relate to display devices with touch input devices and, more specifically, systems and methods for reducing display lag between a touch input device and a display device.

2. Related Art

A display panel that incorporates an overlaid touch sensor panel may be referred to as a touchscreen display, and may provide an interaction system for touch-enabled computing devices (such as mobile phones, tablet computers, laptop computers, or desktop computers). In such computing devices, graphics are displayed on the display panel, and a user may interact with these devices by touching the screen (e.g., by using an active stylus, a passive stylus, or a body part such as a finger), thereby providing an intuitive user interface.

In the touchscreen display, the touch system and display system typically operate independently. Touch events detected by the touch sensor panels are typically processed by high level application software running on an application processor (AP) of the device. That is, the touch system includes a touch controller that processes the signals generated by touch sensors, and that outputs data corresponding to the touch events, such as coordinates, to the AP. The AP is generally located externally from the display. The AP processes the touch events, and updates a display composition accordingly to the display driver interface controller (DDIC). The DDIC processes video images from AP, and outputs pixel driving signals to the display panel.

The many processing operations between the touch sensor panel and the AP, as well as the non-deterministic processing time on the AP (including delays due to other computational tasks that are performed by the AP), introduce high levels of latency that reduce responsiveness of the computing device to the user's touch inputs. For example, contemporary smart phone devices may exhibit delays of about 100 milliseconds (i.e., about 6 frames at 60 frames per second) when writing on the screen with either a finger or stylus.

The above information disclosed in this Background section is only to enhance the understanding of the background of the invention, and therefore it may contain information that does not constitute prior art.

SUMMARY

Embodiments of the present invention are directed to reducing the latency between a touch event and a display response to this touch event.

According to one or more embodiments of the present invention, there is provided a method of generating a mask overlay for a display panel corresponding to a touch path on a touch panel, the method including receiving touch path data including touch points corresponding to the touch path, generating vertex points of a vertex array corresponding to the touch points, generating a polygon for a respective set of the vertex points to define edges of the touch path, determining start edges and stop edges of the polygon for a row of pixels, generating a list of bin offset values corresponding to the row of pixels and including bin offsets for indicating the start edges and the stop edges by incrementing a corresponding bin offset by one for each of the start edges, and by decrementing a corresponding subsequent bin offset by one for each of the stop edges, generating an accumulator value corresponding to each of the pixels of each row, determining whether each of the accumulator values is greater than zero or equal to zero, and generating the mask overlay including bits having values determined by whether a respective one of the accumulator values is greater than zero.

The method may further include receiving a line width setting, and the vertex points may further correspond to the line width setting.

The touch path data may further include pressure data corresponding to the touch path, and the vertex points may further correspond to the pressure data.

The method may further include generating a touch path vector corresponding to a path between adjacent ones of the touch points, and the vertex points may further correspond to the touch path vector.

Generating the accumulator value may include initializing a count, iterating each bin offset in order, adding to or subtracting from the count based on the bin offsets, and entering the count as the accumulator value corresponding to the iterated bin offset.

The generating the mask overlay may include generating a "1" of a one bit enable signal in the mask overlay for each of the accumulator values that is greater than zero to indicate that the corresponding ones of the pixels correspond to an edge or an interior of the polygon, and generating a "0" of the one bit enable signal in the mask overlay for each of the accumulator values that is equal to zero.

The method may further include displaying on a display panel a displayed touch path corresponding to the generated mask overlay.

A number of the pixels in the row of pixels, a number of the bin offsets in the list of bin offset values, and a number of the bits in the mask overlay, are equal.

According to one or more embodiments of the present invention, there is provided a system for generating a mask overlay for a display panel corresponding to a touch path on a touch panel, the system including, a control logic module configured to receive a vertex array including vertex points, and configured to generate a mask overlay based on the vertex array, wherein the control logic module includes an interpolation calculator configured to determine one or more polygons defining edges of the touch path based on the vertex points, and configured to generate start column offsets and stop column offsets respectively corresponding to start edges and stop edges of the one or more polygons at a row of pixels, a histogram module configured to receive the start and stop column offsets, and configured to generate a list of bin offset values based on the start and stop column offsets, and an accumulator and pixel-fill module configured to receive the list of bin offset values, configured to generate an accumulator value for each pixel of the row of the pixels based on the list of bin offset values, and configured to generate mask overlay based on the accumulator values.

The system may further include a lookup table (LUT) generator configured to receive interpolated touch points corresponding to the touch path, and configured to generate the vertex array based on the interpolated touch points.

The system may further include a LUT storage module configured to receive and store the vertex array from the LUT generator, and configured to output the vertex array to the control logic module.

The LUT generator may include a line width module.

The LUT generator may be further configured to receive a line width setting, and to generate the vertex array based on the line width setting.

The LUT generator may be further configured to determine one or more vectors corresponding to the touch path, and to generate the vertex array based on the one or more vectors and based on the line width setting.

The list of bin offset values may include a plurality of bin offsets, each of which including a value that corresponds to a respective column offset.

The list of bin offset values may include a same number of bins as a number of the pixels in the row.

Each of the bins may include an n-bit memory to store a value corresponding to one of the pixels at an edge intersection.

According to one or more embodiments of the present invention, there is provided a method of generating a mask overlay for a display panel corresponding to a touch path on a touch panel, the method including generating polygons corresponding to a vertex array defining edges of the touch path, determining start edges and stop edges of the polygons for a row of pixels, generating bin offsets including values corresponding to the start edges and the stop edges, generating an accumulator value corresponding to each of the pixels based on the bin offsets, and generating the mask overlay including bits having values determined by whether a respective one of the accumulator values is greater than zero.

The vertex array may include vertex points corresponding to touch points of the touch path.

The vertex points may further correspond to a pressure on the touch panel.

BRIEF DESCRIPTION OF THE DRAWINGS

The accompanying drawings, together with the specification, illustrate exemplary embodiments of the present invention, and, together with the description, serve to explain features of the present invention, wherein.

DETAILED DESCRIPTION

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" may encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic devices or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Some portions of the following detailed descriptions are presented in terms of algorithms and/or symbolic representations of operations on data bits that may occur within a computer/server memory. These descriptions and representations are used by those skilled in the art of data compression to convey ideas, structures, and methodologies to others skilled in the art. An algorithm is a self-consistent sequence for achieving a desired result and requiring physical manipulations of physical quantities, which may take the form of electro-magnetic signals capable of being stored, transferred, combined, compared, replicated, reproduced, and otherwise manipulated. Such signals may be referred to as bits, values, elements, symbols, characters, terms, numbers, or the like. These and similar terms are associated with appropriate physical quantities, and are used as representative labels for these quantities. Accordingly, terms such as "processing," "computing," "calculating," "determining," "displaying" or the like, refer to the action and processes of a computing device or system that manipulates data represented as physical quantities within registers/memories into other data that is also represented by stored/transmitted/displayed physical quantities.

Embodiments of the present invention provide a new method to fill line segments corresponding to a touch event on a touchscreen display. A method of embodiments of the present invention is configured to allow for operation even when touch events are complicated and produce a line that overlaps a previous drawn line. The method allows for a lookup table (LUT) to store a set of vertex data, which does not require sorting or classification of a left/right edge of the line segments, and which minimizes the complexity and memory required for the control logic to generate mask data from the LUT. Accordingly, embodiments of the present invention allow a user to perceive a faster touch response by displaying an image based on the touch locations in advance of the application processor (AP) rendered image.

Software designed for touch interfaces often use direct physical manipulation of pseudo "real-world" objects and/or the drawing of paths on the screen to provide visual feedback (e.g., for the trace of a finger on a swiping or gesture-based on-screen keyboard, for the trace of a path in a drawing or sketchbook application, and/or for a path drawn in a game).

A common issue of mobile phones is lag (i.e., lag time, or latency) of the user interface. Current mobile phones take up to 200 milliseconds to update the display in response to a touch action. For example, the typical display response time to a touch event as measured on a related art smart phone may be about 100 milliseconds, or about 6 frames of video images, based on a refresh rate of 60 frames per second (FPS). This display lag is noticeable by a large portion of users.

Figure 1A:
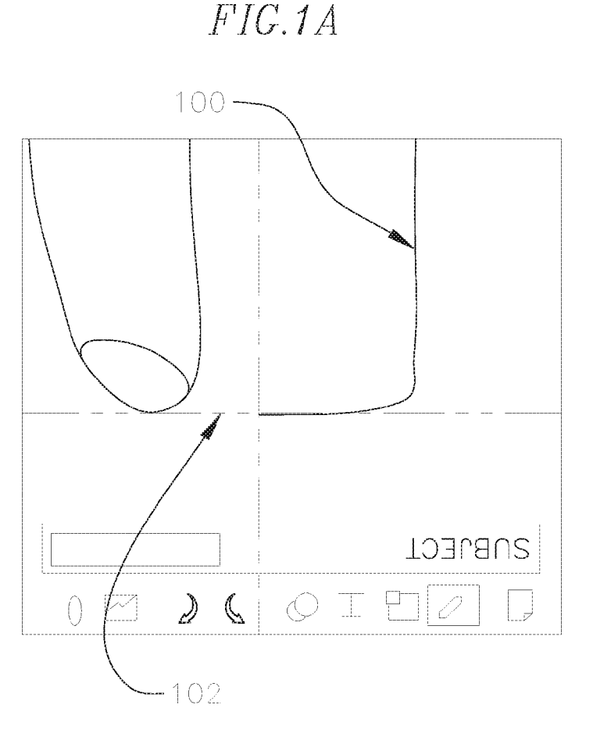
FIG. 1A illustrates the response of a device including a related art touch input processing device.
Figure 1B:
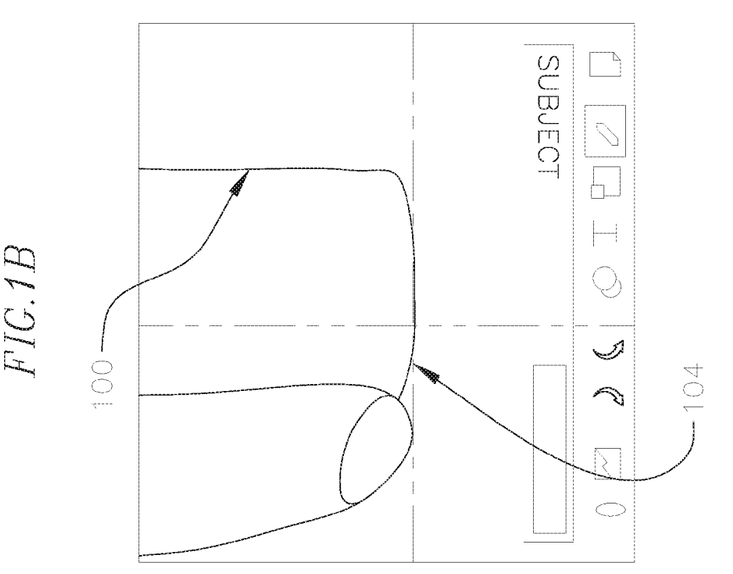
FIG. 1B illustrates the response of a device including a touch input processing device according to embodiments of the present invention.

FIG. 1A illustrates the response of a device including a related art touch input processing device, and FIG. 1B illustrates the response of a device including a touch input processing device according to embodiments of the present invention.

Referring to FIG. 1A, a displayed line (e.g., a generated touch path) 100 has a gap 102 between the position of a finger and a last drawn portion of the displayed line 100. The gap 102 corresponds to a noticeable display lag between a time a touch is applied to a touchscreen display, and a time that the displayed line 100 appears on the display. Similar display lag is also typically encountered when using a stylus, whether active or passive.

Referring to FIG. 1B, the displayed line 100 includes an additional computed portion 104 that is generated by a low latency overlay system of embodiments of the present invention, thereby reducing the display lag/gap 102 perceived by the user, and allowing the user to perceive a faster touch response by overlaying an image (e.g., the computed portion 104) in the touch path in advance of the AP rendered image. By reducing the gap 102 between a current touch contact point and the displayed line 100 on the screen, the perceived display lag may be decreased. As used herein, the term "overlay," when used as a verb, refers to combining video images with additional image data, such that the additional image data (e.g., data corresponding to the computed portion 104) replaces, or overlays, some portion of the original video images. The term "overlay," when used as a noun, (e.g., a "mask overlay") may also refer to the appearance of the computed portion 104 as a result of the additional image data in the combined display image. In addition, by using a mask overlay, application software may also control a region (e.g., location on the display), color, and rendering operation of the displayed line 100 in response to a touch event.

Figure 2:
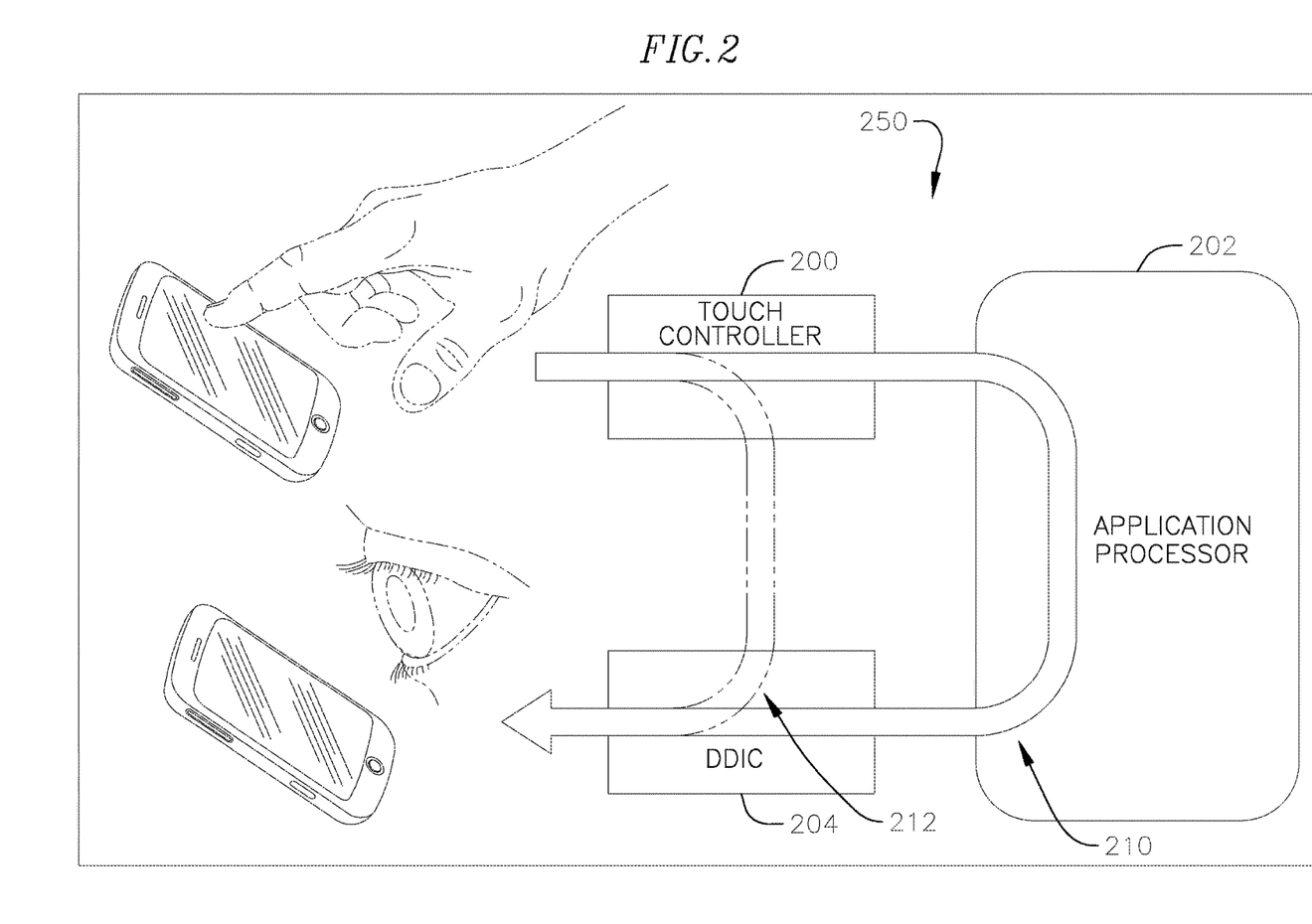
FIG. 2 is a schematic illustration of both a related art feedback path, and a low latency feedback path according to an embodiment of the present invention.

FIG. 2 is a schematic illustration of both a related art feedback path, and a low latency feedback path according to an embodiment of the present invention.

Referring to FIG. 2, a computing device 250 of the present embodiment is directed to a low latency overlay system that, when compared to related art systems, provides visual feedback more quickly over a low latency path 212 through a touch controller 200 and a display driver interface controller (DDIC) 204, followed by visual images at longer levels of latency over a longer latency path 210 through an application processor 202.

A general touch screen system typically operates independently of a corresponding display system. A touch sensor panel is configured to detect touch events (e.g., touch inputs, or a user's touches on the touch sensor panel). The touch sensor panel is configured to generate touch signals that are supplied to a touch controller 200 (e.g., over a data bus). The touch signals output by the touch sensor panel may correspond to signals, or raw data (e.g., measurements of capacitance, voltage, or current corresponding to detected touch locations of the touch sensor panel), or may correspond to computed touch locations based on processed raw data.

The touch sensor panel of the present embodiment may detect touch events using any object that may be detected by the touch sensor panel, including devices (such as an active stylus or a passive stylus) and body parts (such as a finger or a hand), and may be any type of touch input panel (e.g., resistive touch panels, surface acoustic wave touch panels, capacitive touch panels, infrared touch panels, optical touch panels etc.).

Figure 3:
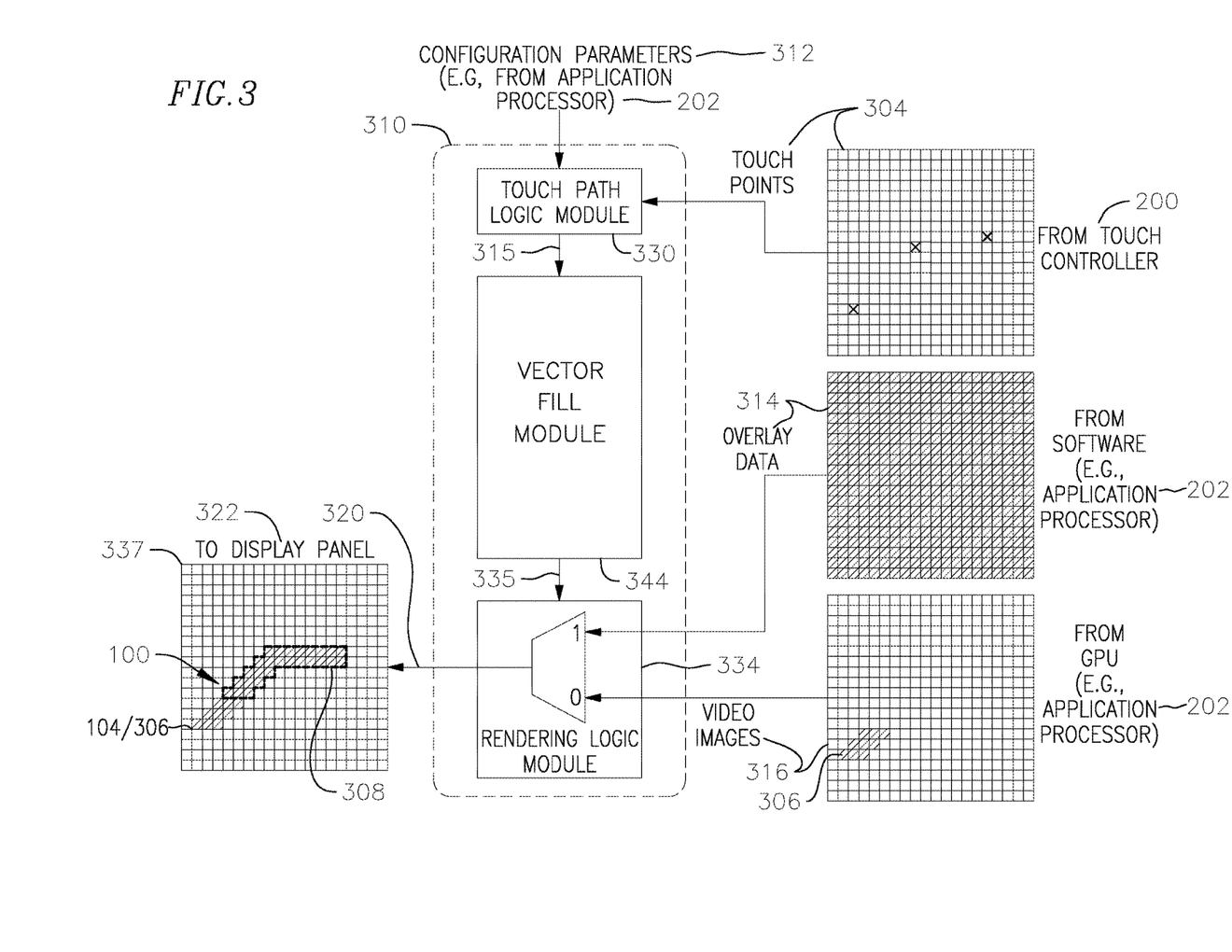
FIG. 3 is a schematic illustration of the combination of video images, overlay data, and touch path information to generate a combined display image, in accordance with an embodiment of the present invention.

The touch controller 200 of the present embodiment may process the touch signals from the touch sensor panel, and may output touch points (e.g., coordinates of touch points) to an application processor (AP) 202 via a data bus that is connected to both the AP 202 and a low-latency overlay system (e.g., the low-latency overlay system 310 of FIG. 3). The touch points may be a stream of data values corresponding to the computed touch locations, and may optionally include pressure data indicating an amount of pressure applied to the touch sensor panel during the touch event.

The AP 202 is connected to the DDIC 204, and processes the touch points. Application software on the AP 202 updates a display composition by rendering video images (e.g., a video image, one or more frames of video images, or video image data) to the DDIC 204 for displaying an image on a display panel. The AP 202 may include a central processing unit (CPU), a graphical processing unit (GPU), and memory. The AP 202 may also output configuration parameters and mask overlay data to the low-latency overlay system, as will be described later.

The DDIC 204 is connected to the display panel, and receives and processes the video images received from the AP 202, and outputs pixel driving signals to the display panel. The touch sensor panel, the touch controller 200, the DDIC 204, and the display panel may all be components of a single display module, which may be separate from the AP 202. In other embodiments, the touch controller 200 may be a portion of a larger integrated circuit. For example, the touch controller, the AP 202, and/or the DDIC 204 may be implemented as a single integrated circuit. Alternatively, the touch sensor panel, the touch controller 200, the DDIC 204, and the display panel, or combinations thereof, may reside in separate modules, or may be combined with the AP 202. The display panel may be, for example, an organic light emitting diode (OLED) display panel or a liquid crystal display (LCD) panel.

FIG. 3 is a schematic illustration of the combination of video images, overlay data, and touch path information to generate a combined display image, in accordance with an embodiment of the present invention.

Referring to FIG. 3, according to the present embodiment, a low-latency overlay system 310 processes touch points 304 with video images 316 so that a display panel 322 shows the displayed line 100 in response to the touch event with reduced lag/gap 102. The low latency overlay system 310 may include a touch path logic module 330, a vector fill module 344 (which may include a lookup table (LUT) generator 331, a lookup table (LUT) storage module 332, and a control logic module 333, as will be described further with reference to FIGS. 4A and 4B), and a rendering logic module 334.

In the present embodiment, the touch path logic module 330 is connected to, and receives touch points 304 from, the touch controller 200, and is also connected to, and receives configuration parameters 312 from, the AP 202.

The touch path logic module 330 may process the touch points 304 received from the touch controller 200, and may generate interpolated touch points (e.g., interpolated time-stamped touch points, or an estimated touch path) 315. The touch path logic module 330 may also process the configuration parameters 312, which may govern characteristics of the displayed line 100. The configuration parameters 312 may be default parameters and/or may be adjusted, and may include, for example, a width of the displayed line 100, a style of generated line segments (e.g., simple straight segments or curves), a region of the display panel 322 wherein the displayed line 100 is allowed (e.g., an active drawing area), and a style of the rendering operation (e.g., antialiasing operations, smoothing operations, and transparency).

The touch path logic module 330 is connected to the vector fill module 344, and may send to the vector fill module 344 both touch path data including the interpolated touch points 315, and the configuration parameters 312, thereby enabling the vector fill module 344 to render the shape of the displayed touch path 100.

Based on the interpolated touch points 315 received from the touch path logic module 330, the vector fill module 344 is configured to generate a set of values referred to as vertex points, which collectively form one or more vertex arrays, and is configured to store the vertex arrays. The vertex points and the vertex arrays will be described in further detail with reference to FIG. 4A.

The vector fill module 344 is also configured to generate a mask overlay 335. The mask overlay 335 of the present embodiment is generated on a line-by-line basis (e.g., a row-by-row basis, or column-by-column basis) for each line of pixels (e.g., each row 339 of pixels 341, as will be described further with respect to FIG. 4B). The vector fill module 344 is connected to the rendering logic module 334, and is configured to supply the mask overlay 335, which may be a bit stream of "1" and/or "0" values, to the rendering logic module 334.

The rendering logic module 334 may also be connected to the AP 202. In addition to receiving the mask overlay 335 from the vector fill module 344, the rendering logic module 334 may also receive overlay data 314 from the AP 202. However, it should be noted that the overlay data 314 may be created within the overlay system 310 without input from the AP 202, or may include a combination of data created within the overlay system 310 and data received from the AP 202. The rendering logic module 334 may be configured to combine the overlay data 314 with the video images 316 according to the mask overlay 335 received from the vector fill module 344, and may be configured to thereby generate a combined display image 337. The rendering logic module 334 may be connected to the display panel 322 to supply the combined display image 337, which includes the overlay data 314 and the video images 316, by sending a series of pixel driving signals 320 to the display panel 322. The rendering logic module 334 may generate the combined display image 337 by selecting between, or by blending, the overlay data 314 and the data of the video images 316.

As mentioned above, the vector fill module 344 of the present embodiment is configured to output the mask overlay 335 on a row-by-row basis for each row of pixels, where the mask overlay 335 for a given row is an array of numerical values, such as "1"s and "0"s, and where each position in the array corresponds to a position of a respective pixel in the row on the display panel 322, which will display the combined display image 337 in response to the pixel driving signals 320. That is, the relative positions of the values in the mask overlay 335 correspond to the relative positions of the pixels (e.g., the mask overlay 335 may be thought of as a one dimensional array corresponding to a one dimensional map of the positions of the pixels that display the combined display image 337). Each of the values of the mask overlay 335 may be represented as a single binary bit, and positions where the overlay data 314 are to be displayed in the combined display image 337 may have the values set to a first value (e.g., "1"), while positions where no overlay data 314 is to be shown (e.g., where the video images 316 are to be shown) may have values set to a second, different value (e.g., "0").

The vector fill module 344 may output data of the mask overlay 335 in synchrony with supply of corresponding data of the video images 316 from the AP 202, so that the mask overlay 335 for a given row of pixels may be supplied to the rendering logic module 334 while the rendering logic module 334 processes the corresponding row of pixels in the video images 316. The synchronization of the control logic module 333 with the video images 316 may be accomplished by supplying horizontal sync (HSYNC) signals 338 and vertical sync (VSYNC) signals 340 of the video images 316 to the overlay system 310 (e.g., to a row counter 343 of the overlay system 310, as shown in FIG. 4B).

As each pixel of the video images 316 is processed by the rendering logic module 334, the rendering logic module 334 retrieves a corresponding value in the mask overlay 335, the position of which corresponds to the location of the pixel in the video images 316. The rendering logic module 334 may substitute the pixel of the video images 316 with the overlay data 314, or may perform a blending of the pixel of the video images 316 and the overlay data 314, in accordance with the mask overlay 335 to achieve desired visual effects (e.g., transparency and/or anti-aliasing). That is, the rendering logic module 334 may output either the overlay data 314, the data of the video images 316, or a blending thereof, to the display panel 322 via the pixel driving signal 320. For example, the rendering operation of the rendering logic module 334 may be specified using a single bit as defined by the values in the mask overlay 335, and may select the output of the rendering logic module 334 to be either the video images 316 or the overlay data 314 for each pixel based on the value at the corresponding position in the mask overlay 335.

In the present embodiment, the number of values of the mask overlay 335 equals the number of pixels of the video images 316, which in turn equals the number of pixels in the combined display image 337. Thus, there is a one-to-one relationship between each value in the mask overlay 335 and each pixel of the video images 316. In other words, the rendering logic module 334 operates by matching, on a row-by-row basis, each value in the mask overlay 335 to a corresponding pixel of the video images 316, and by outputting either the pixel of the video images 316 or the pixel of the overlay data 314 to the display panel 322. For example, the rendering logic module 334 may iterate through each value of the mask overlay 335, and if a value of "0" exists at a particular position in the mask overlay 335, then the rendering logic module 334 outputs the corresponding pixel of the video images 316. On the other hand, if a value of "1" exists at a particular position in the mask overlay 335, then the rendering logic module 334 outputs the overlay data 314. As a result of the iterative process, the rendering logic module 334 outputs a row of the combined display image 337, as represented by the pixel driving signal 320, to the display panel 322. During each frame, the process iteratively operates on each row of the video images 316 to generate the entire combined display image 337 for the frame.

As described above, the rendering logic module 334 receives the video images 316 and the overlay data 314 from the AP 202, and receives the mask overlay 335 from the control logic module 333. Alternatively, the overlay data 314 may be created in the overlay system 310, and characteristics of the overlay data 314 may be determined by the desired output of the rendering logic module 334. For example, the characteristics of the overlay data 314 may be matched to the characteristics of the video images 316 along the displayed line 100 such that, when rendered according to the mask overlay 335, the combined display image 337 depicts a seamless transition between an image segment 308 and an overlay image segment 306 (e.g., the computed portion 104). These characteristics may include a color. For example, if the application software draws a black line, then the overlay data 314 may contain the same black color (e.g., a bitmapped image where all the pixels are black) as the software-drawn line/image segment 308. The rendering logic module 334 may output the combined display image 337 that contains a black line as the displayed line 100, which is formed by adjoining the image segment 308 (e.g., the software-drawn black line) from the AP 202 and the overlay image segment 306 as determined by the mask overlay 335 and by the overlay data 314. The overlay data 314 may also be textured or colored, or may include bitmapped image data. Content of overlay data 314 may be dynamic over time, and may be updated by the AP 202, or may be updated by a mechanism within the DDIC 204. The content may also be dynamic in size and shape.

With respect to the above description, it should be noted that the overlay system 310 may be a component of the DDIC 204, or, alternatively, portions of the overlay system 310 may be in the DDIC 204 and/or in the AP 202, and other portions of the overlay system 310 may be in the touch controller 200. Also, the touch path logic module 330, the rendering logic module 334, and the vector fill module 344, may each be implemented using different application specific integrated circuits (ASICs). Alternatively, various combinations of the various components listed above may be implemented by a single ASIC. Additionally, a field programmable gate array (FPGA) may be programmed to perform the functions of each of the touch path logic module 330, the vector fill module 344, and the rendering logic module 334. Further, the functionality of one or more of the touch path logic module 330, the vector fill module 344, and the rendering logic module 334 may be implemented as components of the AP 202. Furthermore, the touch path logic module 330, the vector fill module 344, and the rendering logic module 334 may be components of the DDIC 204, or one or more of the touch path logic module 330, the vector fill module 344, and the rendering logic module 334 (or components capable of performing these functions) may be located within, for example, the touch controller 200, AP 202, or a separate component. In addition, these components, or the functions they perform, may be located in different portions of the device. For example, the touch path logic module 330 may be a component or a function of the touch controller 200, and the rendering logic module 334 may be implemented as a component or function of the AP 202.

Figure 4A:
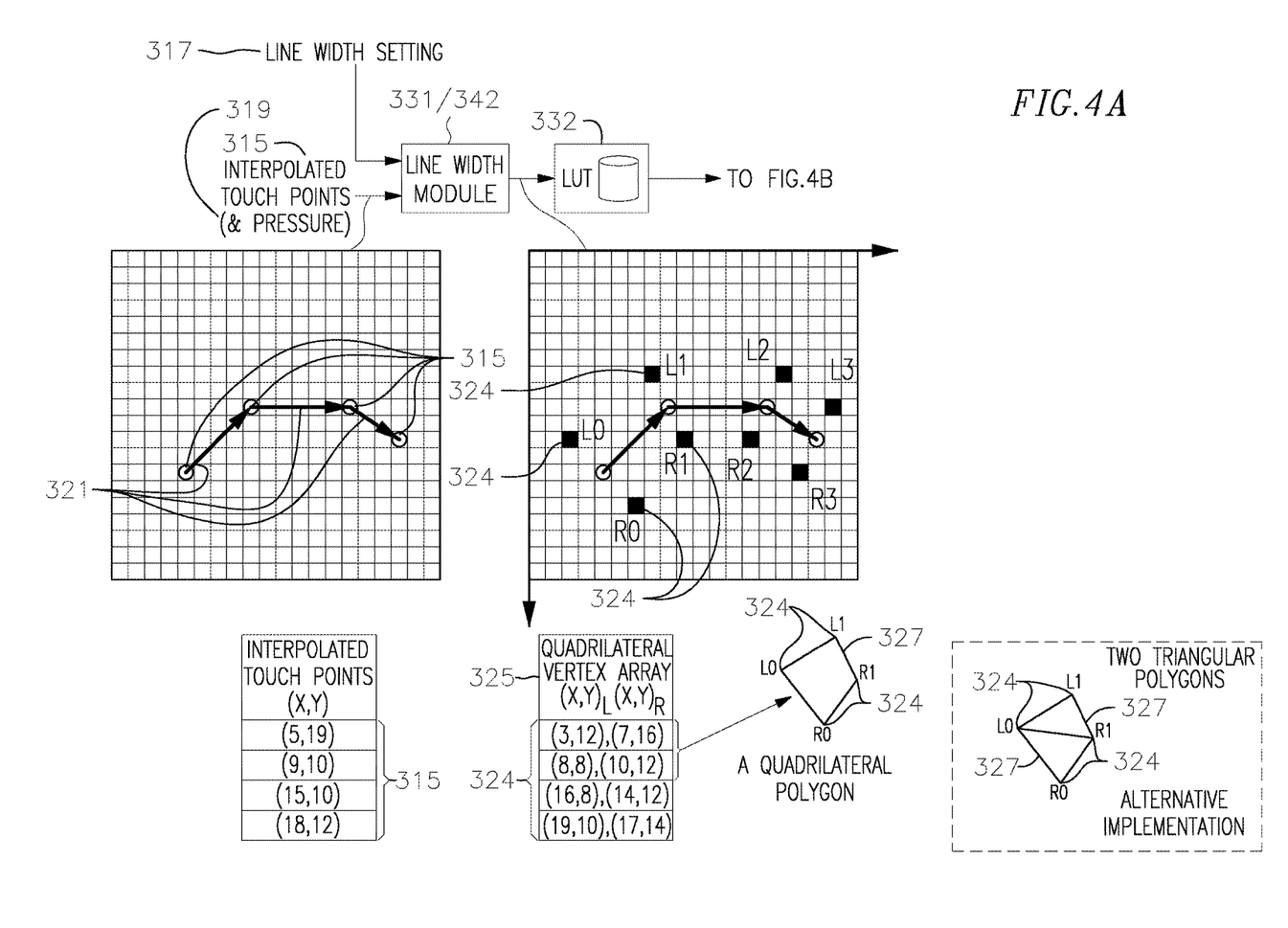
FIGS. 4A and 4B are schematic illustrations of the generation of a mask overlay according to an embodiment of the present invention.
Figure 4B:
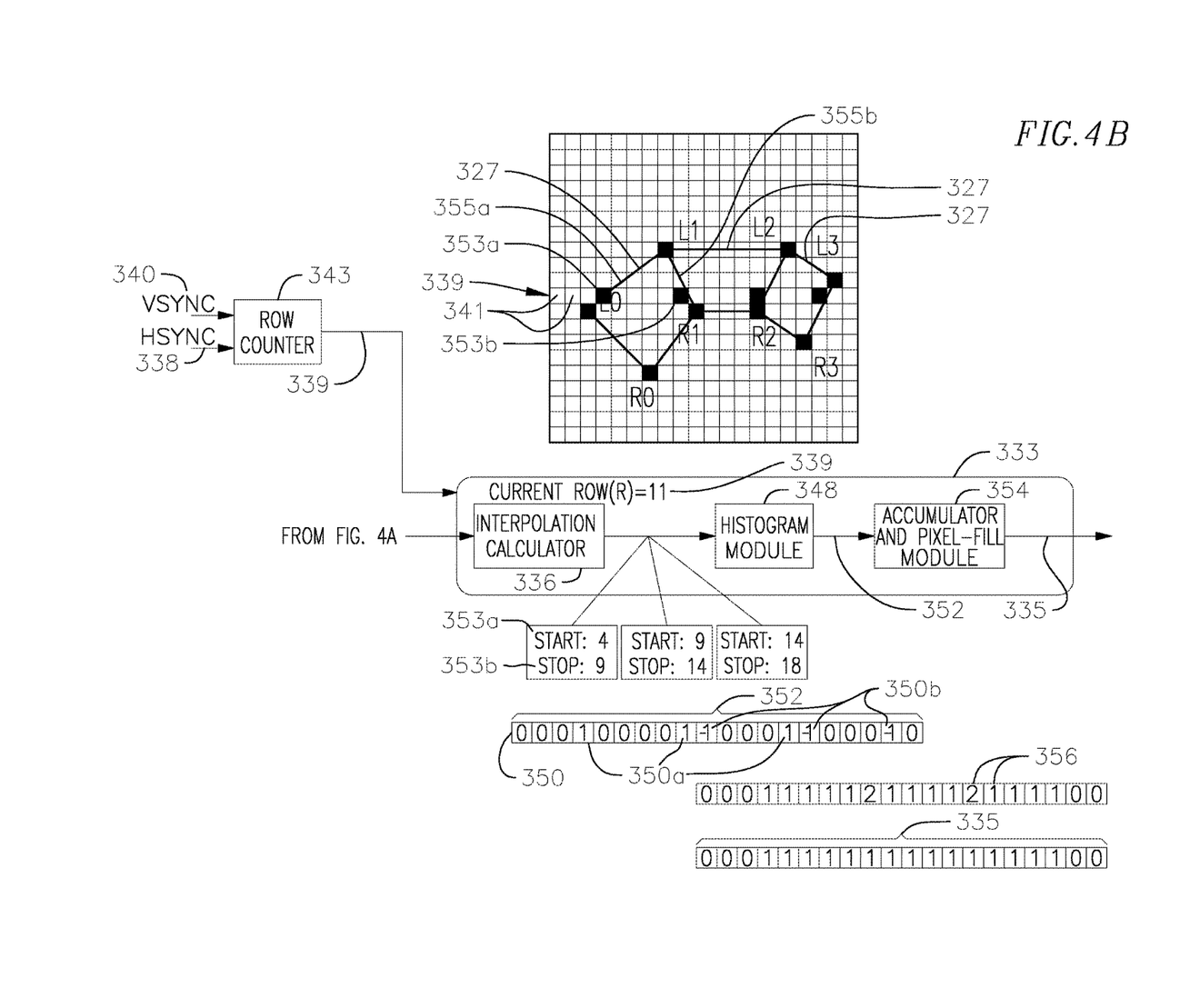

FIGS. 4A and 4B are schematic illustrations of the generation of a mask overlay according to an embodiment of the present invention.

As shown in FIGS. 4A and 4B, a line width module 342 (e.g., a LUT generator 331), which may be a component of the vector fill module 334 of FIG. 3, is configured to receive the interpolated touch points 315 and pressure data 319 (e.g., from the touch path logic module 330), and is configured to receive a line width setting 317 (e.g., from the AP 202 or from software) to generate touch path vectors 321. Based on the generated touch path vectors 321, the line width module 342 is configured to generate a vertex array 325 including zero or more vertex points 324, and is also configured to generate a polygon 327 for each set of adjacent vertex points 324 (e.g., to generate a quadrilateral for each set of four vertex points 324, or to generate a triangle for each set of three vertex points 324). The vertex points 324 can be used to determine an edge of the displayed line 100, and vertex points 324 within 180° of a corresponding vector 321 may correspond to a left vertex point 324 in the vertex array 325, while vertex points 324 within −180° of a corresponding vector 321 may correspond to a right vertex point 324 in the vertex array 325. The line width module 342 is configured to then send the vertex array 325 to the LUT storage module 332, which may also be a component of the vector fill module 334 of FIG. 3.

As mentioned above, a row counter 343 may be included to receive HSYNC signals 338 and VSYNC signals 340, and to output a signal to a control logic module 333 to indicate a current row 339 of pixels 341 to be rendered (e.g., an eleventh row in the present example).

A control logic module 333, which may also be a component of the vector fill module 334 of FIG. 3, is configured to receive the signal indicating the current row 339 from the row counter 343, and is also configured to retrieve the vertex array 325 from the LUT storage module 332. The control logic module 333 includes an interpolation calculator 336, a histogram module 348, and an accumulator and pixel-fill module 354, which are described in further detail below.

The interpolation calculator 336 is configured to receive the vertex array 325 from the LUT storage module 332, and is configured to generate start and stop column offsets 353a, 353b based on the vertex array 325, and based on intersection points 353a, 353b indicating which pixels 341 in the current row 339 contain a start edge 355a or a stop edge 355b of one of the polygons 327. That is, each intersection point 353a, 353b corresponds to either a start column offset 353a or a stop column offset 353b. In other words, from one set of polygon values 327, the first intersecting edge is the start edge 355a, and the second intersecting edge is the stop edge 355b. The intersecting pixel offset is stored as the start column offset 353a or the stop column offset 353b, respectively. If the current row 339 did not intersect polygon values 327, then no start column offset 353a or stop column offset 353b would be stored, or, in other embodiments of the present invention, an alternative placeholder value, such as "−1," may be stored to indicate that no such intersection exists between the row 339 and any polygon values 327.

In the present example, for each set of vertex points (e.g., four vertex points) 324 of the vertex array 325, a polygon (e.g., a quadrilateral) 327 is generated, and accordingly, three quadrilaterals 327 are shown in the present example. For each row 339 of pixels 341, intersection points 353a for each start edge 355a, and intersection points 353b for each stop edge 355b (e.g., each leading edge and trailing edge of each polygon 327, when moving from left to right) are determined to generate start and stop column offsets 353a, 353b.

The current row 339 (i.e., the eleventh row in the present example) crosses a start edge 355a and a stop edge 355b for each of the three polygons 327. In more detail, a start edge 355a of the first quadrilateral occurs at a fourth pixel (e.g., counting from the left) of the row 339, and a stop edge 355b occurs at a ninth pixel. For the second quadrilateral, a start edge 355a occurs at the ninth pixel (e.g., where the stop edge 355b of the first quadrilateral occurs), and a stop edge 355b occurs at a fourteenth pixel. For the third quadrilateral, a start edge 355a occurs at the fourteenth pixel (e.g., where the stop edge 355b of the second quadrilateral occurs), and a stop edge 355b occurs at an eighteenth pixel. Accordingly, the values corresponding to the pixels at locations where the row 339 intersects polygon values 327 are entered as the start and stop column offsets 353a, 353b, respectively.

The histogram module 348 is configured to receive the start and stop column offsets 353a, 353b corresponding to edge information of the polygons 327 from the interpolation calculator 336, and, based on the start and stop column offsets 353a, 353b, is configured to generate a list of bin offset values 352 including a plurality of bin offsets 350 that each respectively correspond to one of the pixels 341 of the current row 339. That is, each entry/bin offset 350 of the list of bin offset values 352 corresponds to a respective one of the pixels 341 of the row 339.

In detail, for each start column offset 353a, a value of 1 is added to the corresponding current bin offset 350a (i.e., fourth, ninth, and fourteenth start column offsets 353a correspond to the fourth, ninth, and fourteenth current bin offsets 350a in the current example). For each stop column offset 353b, however, a value of 1 is subtracted from a subsequent bin offset 350b that immediately follows the corresponding bin offset 350a. That is, a value of 1 is subtracted from a subsequent bin offset 350b immediately following the corresponding current bin offset 350a (i.e., tenth, fifteenth, and nineteenth bin offsets 350b correspond to the stop column offsets 353b of nine, fourteen, and eighteen in the current example). Accordingly, a start edge 355a and a stop edge 355b at a same pixel 341 will not cancel the corresponding values placed in the list of bin offset values 352 generated by the histogram module 348, as a value corresponding to the stop edge 355b will follow a value corresponding to the start edge 355a in the list of bin offset values 352.

The accumulator and pixel-fill module 354 is configured to receive the list of bin offset values 352 from the histogram module 348, and is configured to generate an accumulator value 356 corresponding to each pixel 341 of the current row 339 based on the list of bin offset values 352. Then, the accumulator and pixel-fill module 354 is configured to generate the mask overlay 335 based on the accumulator values 356, and is configured to output the mask overlay 335 to the rendering logic module 334.

In detail, the accumulator and pixel fill module 354 generates accumulator values 356 by initializing a counter to zero for each new row 339 of pixels 341. For each value of the bin offsets 350 of the list of bin offset values 352, the accumulator adds or subtracts the value in the bin offset 350 to or from a corresponding accumulator value 356, and carries the value forward to the subsequent accumulator value 356 (e.g., as a running counter). Accordingly, if an accumulator value 356 corresponding to a bin offset 350 is 1, and if the subsequent bin offset 350 is 0 (i.e., does not correspond to a start edge 355a or a stop edge 355b of a polygon 327), then the subsequent accumulator value 356 will also be a value of 1 (e.g., will remain at 1). The accumulator and pixel-fill module 354 then generates the mask overlay 335 based on the accumulator values 356, with each bit of the mask overlay 335 having a corresponding accumulator value 356. When an accumulator value 356 is greater than zero, then the corresponding bit of the mask overlay 335 will be a "1," thereby indicating that the corresponding pixel 339 corresponds to an edge or interior of one or more of the polygons 327. When an accumulator value 356 is zero, then the corresponding bit of the mask overlay 335 will be "0," indicating that the corresponding location of the combined display image 337 is outside of the displayed line 100.

Figure 5:
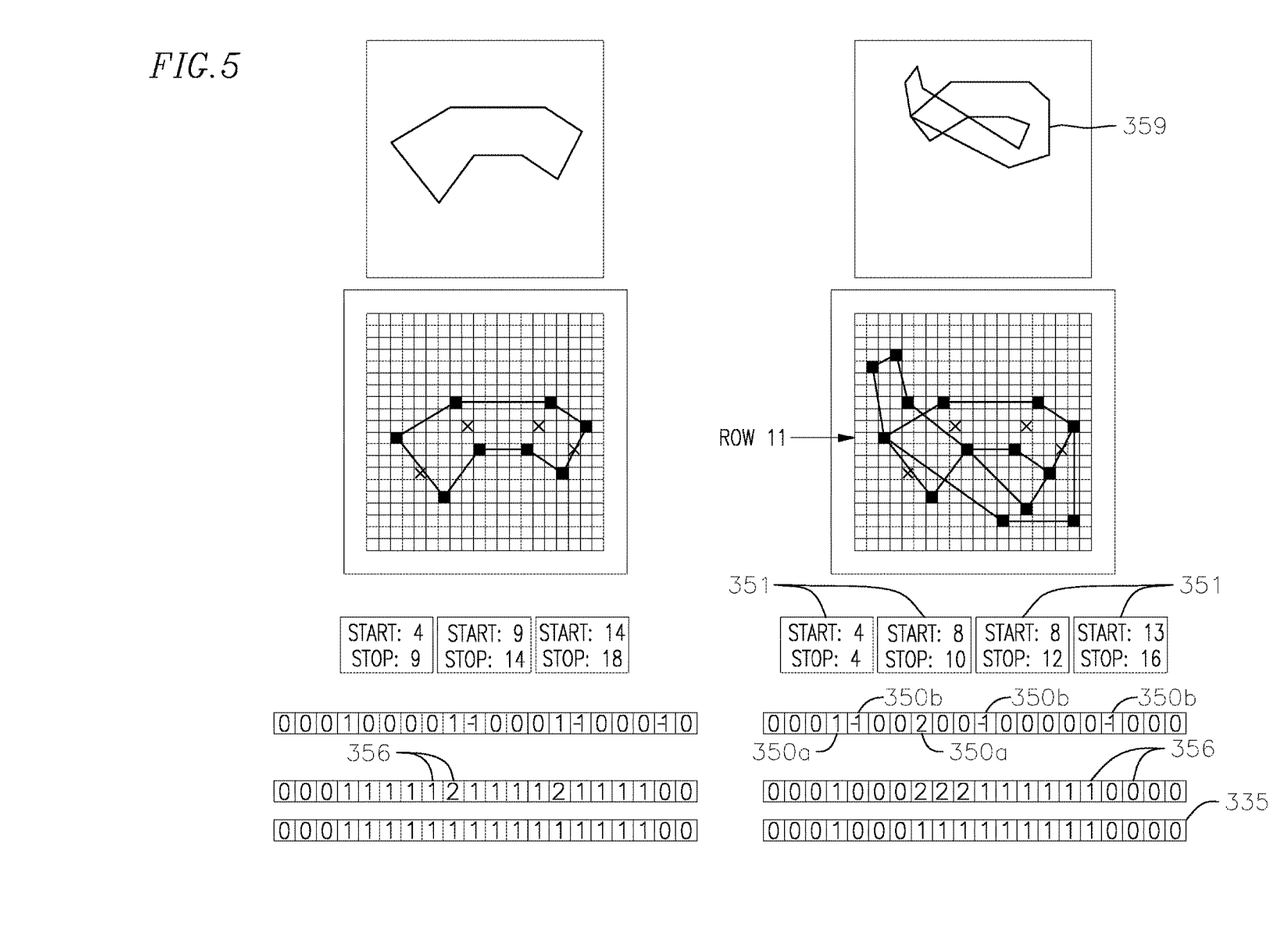
FIG. 5 is an schematic illustration depicting two examples of touch paths and corresponding mask overlays for a row of pixels.

FIG. 5 is an illustration depicting two examples of touch paths and corresponding mask overlays for a row of pixels.

The first example of the touch path (on the left of FIG. 5) is described above with respect to FIGS. 4A and 4B.

A second example (on the right of FIG. 5) may be a touch path 359 that is a continuation of the touch path of the first example. In the second example, the touch path 359 crosses itself. Because the touch path 359 crosses itself, start edges 355a of different polygons 327 may occupy a same pixel 341 in the row 339. To cover such a situation, an edge identifier of a related art device would have to calculate additional special processes, thereby requiring additional computing power. The above described embodiments, however, are able to cover the present situation with less computing power, even when the touch path 359 is relatively complicated and overlaps itself, because the described embodiments analyze a set of polygons, as opposed to analyzing an entirety of an image representing the touch path. Accordingly, embodiments of the present invention are able to give consistent processing independent from image complexity.

In the second example, the eighth pixel of the row 339 corresponds to two start column offsets 353a. Accordingly, the eighth bin offset 350 of the list of bin offset values 352 generated by the histogram module 348 has a value of "2" stored therein (e.g., two polygons 327 both have a start edge 355a at the eighth pixel). Because of the value of "2" stored in the bin offset 350, the accumulator and pixel-fill module 354 will determine that the accumulator values 356 following the eighth accumulator value 356 will be greater than zero until two values corresponding to two stop column offsets 353b are counted (e.g., until two values of "−1" occur in the list of bin offset values 352 without the occurrence of a value of "1"). Accordingly, the mask overlay 335 generated by the accumulator and pixel-fill module 354 will recognize that every pixel from the eighth pixel to a pixel corresponding to the second stop column offset 353b (e.g., the sixteenth pixel) corresponds to the displayed line 100.

Figure 6:
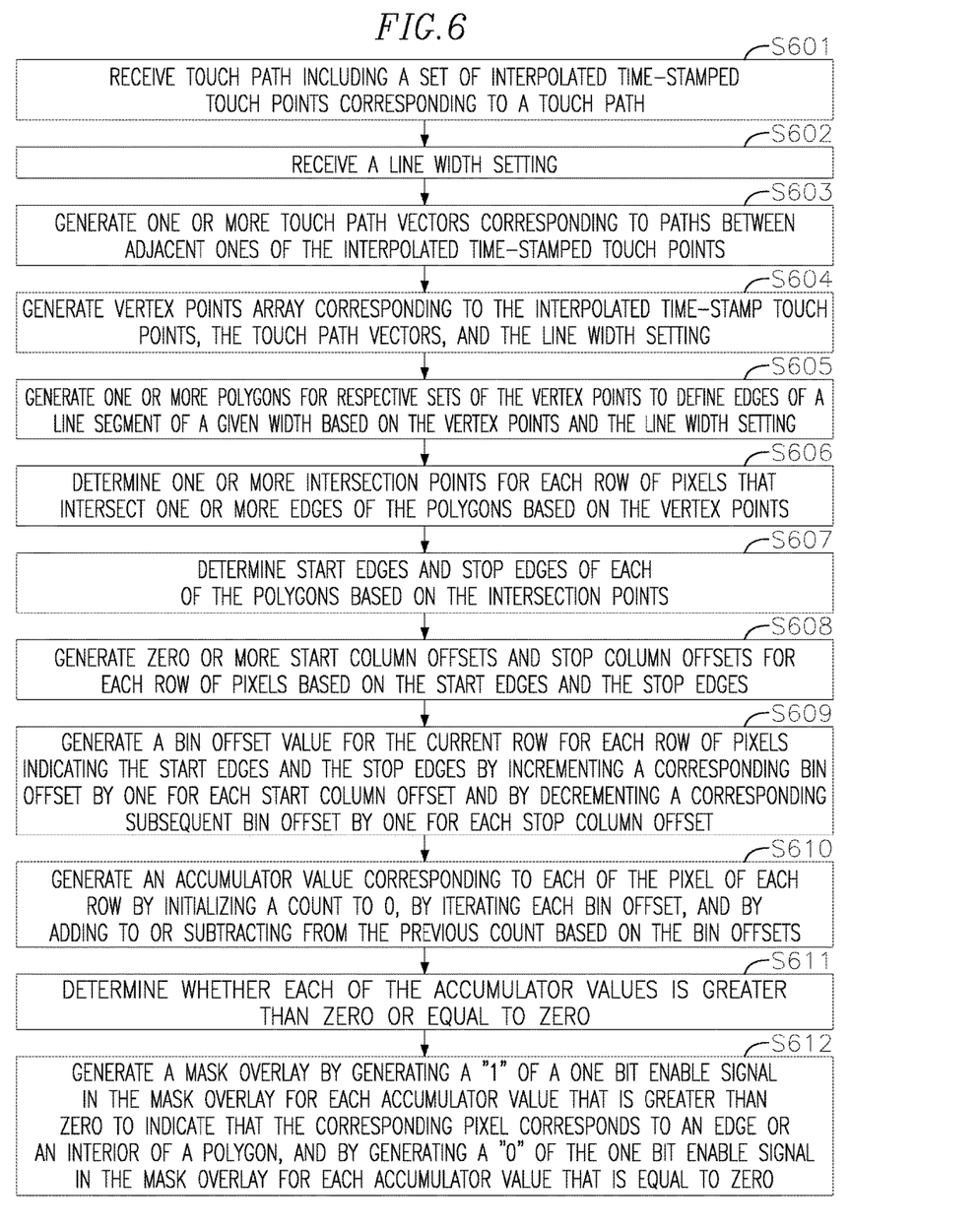
FIG. 6 is a flow chart illustrating a mask overlay generation process according to an embodiment of the present invention.

FIG. 6 is a flow chart illustrating a mask overlay generation process according to an embodiment of the present invention.

Referring to FIG. 6, at operation S601 touch path data including a set of interpolated time-stamped touch points corresponding to a touch path is received (e.g., received at the line width module 342 or the LUT generator 331 from the touch path logic module 330). At operation S602 a line width setting is received (e.g., received at the line width module 342 or the LUT generator 331 from software or the AP 202).

At operation S603, one or more touch path vectors corresponding to paths between adjacent ones of the interpolated time-stamped touch points are generated (e.g., touch path vectors 321 generated by the line width module 342 or the LUT generator 331). At operation S604 zero or more vertex points of a vertex array corresponding to the interpolated time-stamped touch points, the touch path vectors, and the line width setting are generated (e.g., vertex points 324 generated by the line width module 342 or the LUT generator 331). At operation S605 one or more polygons are generated for each set of four vertex points to define edges of a line segment of a given width based on the vertex points and the line width setting (e.g., polygons 327 generated by the line width module 342 or the LUT generator 331).

At operation S606 zero or more intersection points are determined for each row of pixels that intersect zero or more edges of the polygons based on the vertex points (e.g., intersection points 353a, 353b for an eleventh row 339 of pixels 341 determined by the interpolation calculator 336, or zero intersection points for a first row 339 of pixels 341 that is entirely outside of the touch path). At operation S607, start edges and stop edges of each of the polygons based on the intersection points are determined (e.g., start edges 355a and stop edges 355b determined by the interpolation calculator 336). At operation S608 zero or more start column offsets and stop column offsets are generated for each row of pixels based on the start edges and the stop edges (e.g., start column offsets 353a and stop column offsets 353b determined by the interpolation calculator 336).

At operation S609 a bin offset value for the current row is generated for each row of pixels indicating the start edges and the stop edges by incrementing a corresponding bin offset by one for each start column offset, and by decrementing a corresponding subsequent bin offset by one for each stop column offset (e.g., list of bin offset values 352 generated by the histogram module 348).

At operation S610 an accumulator value corresponding to each of the pixels of each row is generated by initializing a count to 0, by iterating each bin offset, and by adding to or subtracting from the previous count based on the bin offsets (e.g., accumulator values 356 generated by the accumulator and pixel-fill module 354 by iterating each bin offset 350 of the list of bin offset values 352). At operation S611 whether each of the accumulator values is greater than zero or equal to zero is determined (e.g., determined by the accumulator and pixel-fill module 354). At operation S612 a mask overlay is generated by generating a "1" of a one bit enable signal in the mask overlay for each accumulator value that is greater than zero to indicate that the corresponding pixel corresponds to an edge or an interior of a polygon, and by generating a "0" of the one bit enable signal in the mask overlay for each accumulator value that is equal to zero (e.g., mask overlay 335 generated by the accumulator and pixel-fill module 354).

Accordingly, the above described embodiments of the present invention are able to provide a simple but effective solution that reduces the latency between a touch event and a display response to this touch event.

While this disclosure has been described in connection with what is presently considered to be practical exemplary embodiments of the present invention, it is to be understood that the present invention is not limited to the disclosed embodiments, but, on the contrary, is intended to cover various suitable modifications and equivalent arrangements included within the spirit and scope of the appended claims and their equivalents.

What is claimed is:

1. A method of generating a mask overlay for a display panel corresponding to a touch path on a touch panel, the method comprising:
   receiving touch path data comprising touch points corresponding to the touch path;
   generating vertex points of a vertex array corresponding to the touch points;
   generating a polygon for a respective set of the vertex points to define edges of the touch path;
   determining start edges and stop edges of the polygon for a row of pixels;
   generating a list of bin offset values corresponding to the row of pixels and comprising bin offsets for indicating the start edges and the stop edges by incrementing a corresponding bin offset by one for each of the start edges, and by decrementing a corresponding subsequent bin offset by one for each of the stop edges;
   generating an accumulator value corresponding to each of the pixels of each row;
   determining whether each of the accumulator values is greater than zero or equal to zero; and
   generating the mask overlay comprising bits having values determined by whether a respective one of the accumulator values is greater than zero.

2. The method of claim 1, further comprising receiving a line width setting,
   wherein the vertex points further correspond to the line width setting.

3. The method of claim 1, wherein the touch path data further comprises pressure data corresponding to the touch path, and
   wherein the vertex points further correspond to the pressure data.

4. The method of claim 1, further comprising generating a touch path vector corresponding to a path between adjacent ones of the touch points,
   wherein the vertex points further correspond to the touch path vector.

5. The method of claim 1, wherein generating the accumulator value comprises:
   initializing a count;
   iterating each bin offset in order;
   adding to or subtracting from the count based on the bin offsets; and
   entering the count as the accumulator value corresponding to the iterated bin offset.

6. The method of claim 1, wherein the generating the mask overlay comprises:
   generating a "1" of a one bit enable signal in the mask overlay for each of the accumulator values that is greater than zero to indicate that the corresponding ones of the pixels correspond to an edge or an interior of the polygon; and
   generating a "0" of the one bit enable signal in the mask overlay for each of the accumulator values that is equal to zero.

7. The method of claim 1, further comprising displaying on a display panel a displayed touch path corresponding to the generated mask overlay.

8. The method of claim 1, wherein a number of the pixels in the row of pixels, a number of the bin offsets in the list of bin offset values, and a number of the bits in the mask overlay, are equal.

9. A system for generating a mask overlay for a display panel corresponding to a touch path on a touch panel, the system comprising,
   a control logic module configured to receive a vertex array comprising vertex points, and configured to generate a mask overlay based on the vertex array,
   wherein the control logic module comprises:
      an interpolation calculator configured to determine one or more polygons defining edges of the touch path based on the vertex points, and configured to generate start column offsets and stop column offsets respectively corresponding to start edges and stop edges of the one or more polygons at a row of pixels;
      a histogram module configured to receive the start and stop column offsets, and configured to generate a list of bin offset values based on the start and stop column offsets; and
      an accumulator and pixel-fill module configured to receive the list of bin offset values, configured to generate an accumulator value for each pixel of the row of the pixels based on the list of bin offset values, and configured to generate mask overlay based on the accumulator values.

10. The system of claim 9, further comprising a lookup table (LUT) generator configured to receive interpolated touch points corresponding to the touch path, and configured to generate the vertex array based on the interpolated touch points.

11. The system of claim 10, further comprising a LUT storage module configured to receive and store the vertex array from the LUT generator, and configured to output the vertex array to the control logic module.

12. The system of claim 10, wherein the LUT generator comprises a line width module.

13. The system of claim 10, wherein the LUT generator is further configured to receive a line width setting, and to generate the vertex array based on the line width setting.

14. The system of claim 13, wherein the LUT generator is further configured to determine one or more vectors corresponding to the touch path, and to generate the vertex array based on the one or more vectors and based on the line width setting.

15. The system of claim 9, wherein the list of bin offset values comprises a plurality of bin offsets, each of which comprising a value that corresponds to a respective column offset.

16. The system of claim 9, wherein the list of bin offset values comprises a same number of bins as a number of the pixels in the row.

17. The system of claim 16, wherein each of the bins comprises an n-bit memory to store a value corresponding to one of the pixels at an edge intersection.

18. A method of generating a mask overlay for a display panel corresponding to a touch path on a touch panel, the method comprising:
- generating polygons corresponding to a vertex array defining edges of the touch path;
- determining start edges and stop edges of the polygons for a row of pixels;
- generating bin offsets comprising values corresponding to the start edges and the stop edges;
- generating an accumulator value corresponding to each of the pixels based on the bin offsets; and
- generating the mask overlay comprising bits having values determined by whether a respective one of the accumulator values is greater than zero.

19. The method of claim 18, wherein the vertex array comprises vertex points corresponding to touch points of the touch path.

20. The method of claim 19, wherein the vertex points further correspond to a pressure on the touch panel.

* * * * *